United States Patent [19]

Kallenberg

[11] Patent Number: 4,745,404
[45] Date of Patent: May 17, 1988

[54] DISPLAY DEVICE FOR PLANNING PURPOSES

[75] Inventor: Rüdiger Kallenberg, Ahrensburg, Fed. Rep. of Germany

[73] Assignee: Edding AG, Ahrensburg, Fed. Rep. of Germany

[21] Appl. No.: 932,785

[22] Filed: Nov. 19, 1986

[30] Foreign Application Priority Data

Nov. 23, 1985 [DE] Fed. Rep. of Germany ....... 3541519

[51] Int. Cl.$^4$ .............................................. H04Q 9/00
[52] U.S. Cl. .................... 340/752; 340/717; 340/825.35; 340/286 M
[58] Field of Search ............. 340/784, 752, 717, 525, 340/286 M, 825.35, 706, 710, 825.53, 825.52

[56] References Cited

U.S. PATENT DOCUMENTS

| | | | |
|---|---|---|---|
| 3,594,762 | 7/1971 | Gardberg et al. | 340/706 |
| 3,754,245 | 8/1973 | Peprnik | 340/286 M |
| 4,438,432 | 3/1984 | Hurcum | 340/825.35 |

FOREIGN PATENT DOCUMENTS

7721465 11/1977 Fed. Rep. of Germany .

OTHER PUBLICATIONS

Technische Rundschau, No. 52, Dec. 4, 1973, p. 7 (German language article entitled "Elektronisches Anzeigesystem").

Technische Mitteilungen AEG-Telefunken 61 (1971), pp. 113-115 (German language article entitled "Electronisches Informations-anzeigesystem mit VARI-SYMBOL-Anzeige").

Electronic Displays and Information Systems and on Board Electronics: Society of Automotive Engineers, 1982, Warrendale (article entitled "Liquid Crystal Displays with Integrated Electronics for Dashboard Instrumentation").

*Primary Examiner*—John W. Caldwell, Sr.
*Assistant Examiner*—Alvin Oberley
*Attorney, Agent, or Firm*—Kinney & Lange

[57] ABSTRACT

An improved planning purpose display device includes a board bearing a display surface with an electrically isolated matrix of conductors embedded therein, with the display surface having at least one hole at each intersection of conductors. A plurality of LCD display elements are conductively mountable in the holes of the display surface, and each LCD display element is controllable by a microprocessor therein. A computer connected to the conductors is adapted to communicate with the LCD display elements mounted on the display surface, interrogate each LCD display element with respect to its position on the display surface, the contents of the memory of its microprocessor and/or to program the memory of that microprocessor.

3 Claims, 1 Drawing Sheet

DISPLAY DEVICE FOR PLANNING PURPOSES

The invention relates to a display device, particularly for planning purposes, comprising a board means having a display surface, said board means being adapted to be attached to a wall, a stand, or the like.

Display boards for planning purposes have become known which are operated with data cards to be inserted. The data cards which are provided with different colors, are received by corresponding slots in the display board. It has also become known instead of data cards consisting of paper or carton to use magnetic display elements which are adapted to be detachably fitted by hand at the magnetically effective display surface. Such display elements, too, must be provided with indicia before use.

It has also become known in connection with planning work to include an electronic data processing system. With conventional systems, the desired content of the display boards is read out and with the aid of a usual keyboard is read into the correspondingly programmed computer. Such a process, however, is relatively expensive and not free of errors.

It is the object of the invention to provide a display device especially for planning purposes, which may be used as a planning means adapted to be further developed individually, in which a computer may recognize the position of the display elements as well as the contents thereof independently of their position on a display surface.

In the case of the invention, the display elements are components adapted to be selectively fitted by hand ad libitum at any crossings of the electric conductors on the display board. They may be magnetic, in order to be fitted at the magnetically effective display surface. Advantageously, however, one or two holding pins are fitted at the rearside of the display elements which cooperate with suitable holes in the display surface and, at the same time, get into contact with the electric conductors of the board. A matrix of electric conductors is arranged in the display board in such a manner that they are isolated from each other at the crossings. The conductors may be fitted directly on the upper surface of the display surface but are suitably disposed in a more or less countersunk arrangement. The conductors are all of them connected to a computer. With the aid of the computer, therefore, pulses may be transmitted to all and any one of the conductors. Inversely, the conductors may also serve for the transmission of pulses of the display elements onto the computer.

The display elements comprise an LCD display and a programmable micro processor. The display elements are therefore electrically effective components. With the aid of the LCD display of the display elements it is possible to display symbols, figures, letters, and combinations thereof. The triggering of the LCD display is effected through the micro processor. The current source for operating the micro processor and the LCD display may be accommodated in the display element. Alternatively, a current source may be connected to the electrical conductors, so that the electric energy is adapted to be coupled into the display element via the crossings.

Each display element is provided with a desired identification or a code, which is adapted to be programmed into the micro processor in a manner known per se. The programming may be effected, for example, in such a manner that the display element is set on a crossing and the computer programs the micro processor with the desired identification or the desired code. Likewise, this code is inputted into the computer. If the computer, now, scans the grid of the conductors, it may detect which display elements are arranged at which crossings and which crossings are empty. For this purpose, a signal coupling is required to take place between the micro processor of the display elements and the conductors of the display surface. The pulses from the computer are transmitted to the corresponding micro processor via a suitable inductive and/or capacitive coupling. An electroplated connection is preferred, because it is more favourable for the current supply of the display elements. So that the computer "knows" that it scans a certain display element, a corresponding signal message must be transmitted from the display element back to the computer. An interrogation signal from the computer, therefore, must be answered with an response of the micro processor of the display element. This response contains at least the code of the display element. Besides, it is also possible with the same interrogation signal and a different interrogation signal from the computer to interrogate the content of the memory of the micro processor in view of the LCD display. In this manner, it is possible not only to gain access to the sites of the display elements and the empty sites of the display surface from the computer, but to gain access also to the contents of display of the display elements. Finally, it is also possible by overplaying display signals from the computer to predetermine or to change the content of display in the LDC display. If the display elements comprise programming keys, they may also be directly programmed. For this purpose, they may be set ad libitum on any crossing of the conductors, in order to be supplied with electric energy.

With the aid of such a computer, therefore, it is possible to interrogate the display surface of the display device according to the invention with a view to the respective actual condition. Independently of whether an operator changes by hand individual display elements in their position or even removes some and adds others, it is possible with the aid of the computer to display the data at a remote site, for example, via printers, monitors, etc. Besides, the data of the display device may be processed in an electronic data processing system. Inversely, it is possible with the aid of a computer to transmit a desired content of display to the memory of the micro processors of the respective display elements.

In case the display elements are provided, for instance, with plug-in pins, which are adapted to be plugged into corresonding sockets in the display surface, in order to establish a connection with the electric conductors at the crossings, this connection also serves to retain the display elements at the display surface of the board of the display device.

The invention will be described in the following in more detail by way of drawings.

Figure 1:
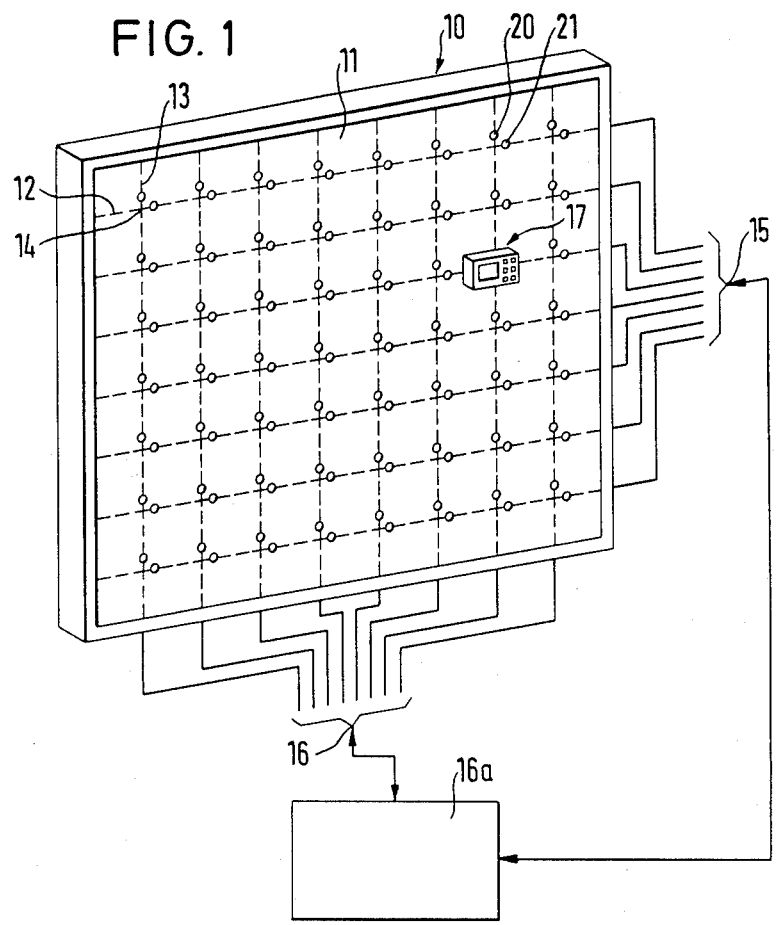
FIG. 1 shows in a diagrammatic perspective view a display device for planning purposes according to the invention.
Figure 3:
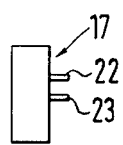
FIG. 3 shows an end view of the display element according to FIG. 2.

FIG. 1 shows a mobile board 10 which may be attached to a wall, for example. The board 10 comprises a front side defining a display surface. Disposed in countersunk arrangement in the board 10 in non-conductive material is a matrix 11 of electrically conductive line conductors 12 and column conductors 13. The conductors 12, 13 which are isolated from each other at crossings 14, may also be arranged on the upper surface of the board. As is shown at 15 and 16, all the conductors are connected to a computer 16a. On the display surface of the board 10 individual display elements may be arranged, a single one of them only being shown at 17. A pair of holes 20, 21 are formed in the display surface of the board for each crossing of the conductors 12, 13; they lead to the conductors 12, 13 and serve for the accommodation of plug-in pins 22,23 at the rearside of the elements 17 (FIG. 3). Thereby, the display element is held. At the same time, however, an electric connection is established with the display element.

Figure 2:
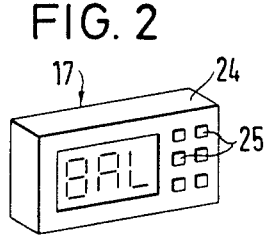
FIG. 2 shows in a diagrammatic perspective view a display element of the display device according to FIG. 1.
Figure 4:
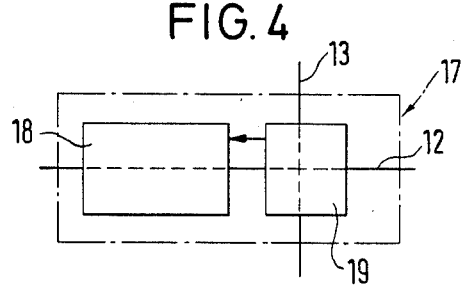
FIG. 4 shows a block diagram for the display element according to FIG. 2.

FIG. 2 shows the display element 17 on a slightly enlarged scale. It comprises a parallelepipedal housing 24 with an arrangement 18 of LCDs and a micro processor 19 (FIG.4) with programmable memory accommodated therein. The micro processor may be programmed via a keyboard 25. The LCD display is triggered with the aid of the micro processor 19, i.e. the content of the display transferred to the display 18. It goes without saying that instead of the LCD display another electronically triggerable display arrangement may also be used. The micro processor 19 is adapted to be coupled to the conductors 12, 13 by mechanical contact via the pins 22, 23. It is also possible to design a plug-in pin in such a manner that it gets into contact with both conductors 12, 13 by separate conductor portions, in order to connect them to the micro processor 19. The current supply for the conductors 12, 13 may likewise take place through the block 16a. This is not shown in detail.

The display device for planning purposes as shown operates as follows:

The time axis is disposed, for example, in the abscissa of the system of coordinates erected by the conductors 12, 13. The individual departments, for example, of an manufacturing process through which a workpiece or a product is to pass, are plotted on the ordinate. The display elements 17 serve to identify this workpiece or this product. The data defining the product may be displayed with the aid of the micro processor 19 via the LCD display 18. This display such as "8 AL" as indicated, for example, with the arrangement of a respective display element 17 at a crossing may take place constantly. A display may, however, also take place only through a respective release via the computer 16a. The latter triggers the micro processor 19. The latter either is actuated only, in order to in its turn transmit the content of a memory to the display 18. Alternatively, the display via the micro processor 19 may also take place directly from the computer 16a. The micro processor, in addition, comprises a memory into which a certain identification for the respective display element 17 is inputted, so that the computer 16a may detect the display element when scanning the individual column and line conductors. When the micro processor 19 of a display element is scanned, it will transmit its identification signal to the computer 16a which thus will be able to establish which display elements 17 are to be detected at which crossings. Empty sites are likewise detected as such. Thereby it is possible with the aid of the computer 16a to sense the respective condition of the display board 10 from the computer 16a and, in case of necessity, to indicate it by a display (not shown). Further processing of the planning data of board 10 may again be performed by the computer 16a with the aid of a known-per-se electronic data processing system.

The computer 16a may also be used to program the micro processor 19 for a desired content of display, for example, for the display 18 and/or for a desired identification. The display elements 17 may also be programmed directly via the keyboard 25. For this purpose, they may be set ad libitum on any crossing as desired of the conductors 12, 13, so that they are supplied with the necessary energy.

The computer 16a, which may likewise be small and designed especially for the function of the board, suitably is associated with the individual board. It is furthermore designed in such a manner that it may communicate with usual computers of electronic data processing systems.

I claim:

1. A display device, particularly for planning purposes comprising board means having an approximately plane display surface, a plurality of electrical conductors being arranged on or embedded in the said board, said conductors defining a pattern of perpendicularly crossing coordinates, said conductors being isolated from each other, said board having at least one hole at each crossing of said conductors, leading to both conductors adjacent said crossing, and comprising further a plurality of display elements, said display elements having a housing including a pattern of LCD elements for displaying purposes to be observed on a front side of said housing, and a micro processor including a programmable memory, said micro processor being adapted to control the LCD elements, said housing including further at least one pin extending from a rear side of said housing, said pin being adapted to be inserted in one of said holes to releasably retain said display elements on said display surface of said display board, said pin including at least one conducting portion contacting said conductors adjacent their respective crossing, said conducting portions being connected to said micro processor, and computer means coupled to the plurality of conductors, said computer being adapted to be connected to the individual conductors on or in said display board and to communicate with the display elements on said display surface if the pin is contacting said conductors at the respective crossing in order to interrogate the position of the display element and the contents of said memory thereof and/or to program said memory.

2. The device as set forth in claim 1 wherein two holes per conductor crossing are provided on said display board, two respective pins extending from the rear side of said display elements.

3. The device as set forth in claim 1 wherein a plurality of keys or the like are provided on the front side of said display elements, said keys being adapted to be manually actuated in order to program said micro processor.

* * * * *